March 20, 1945. W. A. DERR 2,372,061
CONTROL SYSTEM
Filed July 12, 1941

Control Station

WITNESSES:
C. J. Weller.
Joe Weber.

INVENTOR
Willard A. Derr.
BY M. Crawford
ATTORNEY

Patented Mar. 20, 1945

2,372,061

UNITED STATES PATENT OFFICE 2,372,061

CONTROL SYSTEM

Willard A. Derr, Wilkinsburg, Pa., assignor to Westinghouse Electric & Manufacturing Company, East Pittsburgh, Pa., a corporation of Pennsylvania Application July 12, 1941, Serial No. 402,179

1 Claim. (Cl. 177—311)

My invention relates, generally, to control systems, and, more particularly, to control systems for controlling and supervising, from a control station, apparatus disposed at a remote station.

Heretofore electrical remote control systems for controlling and supervising, from a control station, apparatus disposed at a remote station have required a source of electrical power at both the control station and the remote station. In such control systems more power is required at the remote station than at the control station, since only low power indicating devices need to be operated at the control station, while at the remote station it is necessary that considerable power be available for operating the controlled apparatus. It is impracticable to transmit the power required at the remote station from the control station, and it is necessary therefore to provide a source of operating power at the remote station.

An object of my invention is to provide a remote control system which shall function to control and supervise from a control station apparatus at a remote station over a single conducting channel and utilizing a source of power at the remote station only.

Another object of the invention is to provide a control system which shall function to control and supervise, from a control station, apparatus at a remote station, which shall require a minimum of apparatus, and which shall be simple and inexpensive to manufacture, install, operate and maintain.

Figure 1:
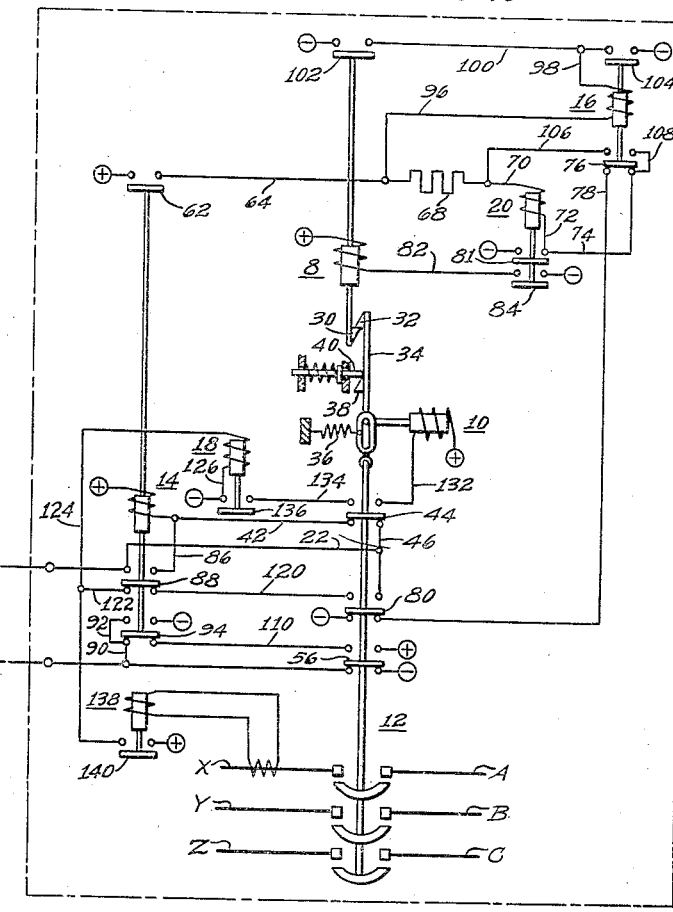
Figure 2:
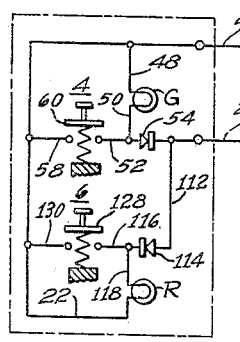
Figure 2:
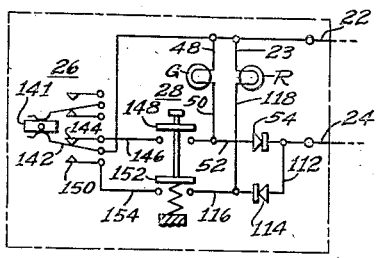
Figure 3:
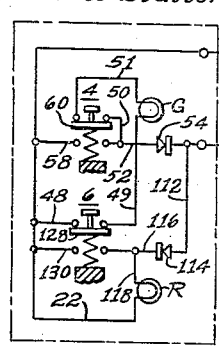
Figure 4:
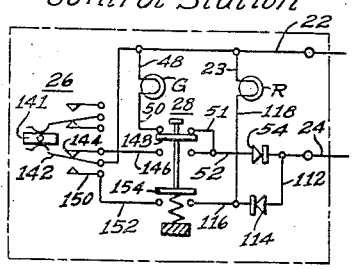

These and other objects and advantages of the invention will be apparent from the following detailed description taken in connection with the accompanying drawing in which:

Figure 1 is a diagrammatic view of a remote control system embodying the principal features of the invention, and Figs. 2, 3 and 4 are diagrammatic views of alternative forms of control means at the control station which may be employed instead of the apparatus at the control station in the embodiment of the invention shown in Fig. 1.

In practicing the invention, there are provided selective manually operable circuit control devices 4 and 6 at a control station which, when selectively actuated, control a closing solenoid 8 and a trip solenoid 10 of a circuit breaker 12 at a remote station through the agency of auxiliary relays 14 and 16, a trip relay 18 and a closing relay 20 also disposed at the remote station. Indicating lamps G and R are controlled by the circuit breaker 12 and the associated auxiliary relay 14 at the remote station to indicate at the control station the position of the circuit breaker 12 at the remote station. These control and supervisory functions are performed over a single channel comprising conductors 22 and 24 which extend between the control and remote stations.

In the alternative embodiment of the control station apparatus shown in Fig. 2, a selector circuit control device 26 and an operating circuit control device 28 perform functions similar to the selectively operable circuit control devices 4 and 6 of the embodiment shown in Fig. 1 and the apparatus shown in Fig. 2 may be substituted for the control station apparatus of Fig. 1.

The embodiments of the control station apparatus shown in Figs. 3 and 4 are similar to the embodiments of Figs. 1 and 2, respectively, but are modified to provide a momentary opening of the circuit of the auxiliary relay 14 before it is connected in circuit with its associated indicating lamp G.

The circuit breaker 12 serves to connect a circuit comprising conductors A, B and C with a circuit comprising conductors X, Y and Z. The source of power for operating the relays, solenoids and indicating lamps may be a station storage battery or any other suitable source of direct current power at the remote station, the connections of the circuits of the system to this source of power are indicated by positive (+) and negative (−) symbols, and these connections are referred to hereinafter as positive power and negative power.

Considering the invention more in detail, the circuit breaker 12 may be actuated to closed circuit position by the closing solenoid 8, through the normally engaged detent members 30 and 32. The detent member 30 is disposed to be actuated by the solenoid 8, and the detent member 32 is mounted upon a member 34 which is pivotally mounted on the circuit breaker actuating mechanism and is biased by a spring member 36 to hold the detent member 32 in position to be engaged by the detent member 30. When the circuit breaker 12 is in closed circuit position, a detent member 38 mounted upon the member 34 will be engaged by a spring-pressed member 40 to hold the circuit breaker in the closed circuit position. The circuit breaker 12 may be tripped from the closed circuit position by the energization of the trip solenoid 10 which will disengage the detent members 32 and 38 from the detent members 40 and 30, respectively, and permit the circuit breaker to return to its open circuit position. It is to be understood that this operating and tripping mechanism for the circuit breaker 12 merely illustrates diagrammatically the general functioning of a trip-free circuit breaker mechanism and is not intended to describe specific circuit breaker mechanism structure.

With the circuit breaker 12 in the open circuit position as shown in the drawing, and the circuit control devices 4 and 6 in the open circuit position as shown, the indicating lamp G will be energized to indicate that the circuit breaker is in the open circuit position in a circuit which extends from positive power through the winding of the auxiliary relay 14, a conductor 42, a contact element 44 in its lower position, conductors 46 and 22, a conductor 48, the indicating lamp G, conductors 50 and 52, a rectifier or other unidirectional current conducting device 54, conductor 24 and a contact element 56 in its lower position to negative power. The characteristics of the winding of the auxiliary relay 14 and the impedance of the lamp G are such that the relay 14 will not be actuated when energized in series circuit with the indicator lamp G.

When it is desired to close the circuit breaker, the circuit control device 4 may be actuated manually to closed circuit position to thereby close a shunting circuit for the indicating lamp G, thus decreasing the impedance of the circuit through the winding of the relay 14 and causing the relay 14 to be actuated. This energizing circuit for the winding of relay 14 extends from positive power through the winding of the relay 14, conductor 42, contact element 44, conductors 46, 22 and 58, contact element 60, conductor 52, rectifier 54, conductor 24, and contact element 56 to negative power. The actuation of the relay 14 will cause it to close a holding circuit for its winding which extends from positive power through the winding of the relay 14, conductors 42, and 86, contact element 88 in its upper position, conductors 22 and 58, contact element 60, the conductor 52, the rectifier 54, the conductor 24, conductors 90 and 92, and a contact element 94 of the relay 14 in its upper position to negative power. Thus the relay 14 will be energized so long as the circuit control device 4 is held in closed circuit position.

The actuation of the auxiliary relay 14 causes its contact element 62 to move to closed circuit position to close an energizing circuit for the closing relay 20 which extends from positive power through the contact element 62, a conductor 64, a current limiting resistor 68, a conductor 70, the winding of the closing relay 20, conductors 72 and 74, a contact element 76 of the auxiliary relay 16 in its lower position, a conductor 78 and a contact element 80 in its lower position to negative power. This energization of the closing relay 20 will cause it to be actuated to close an energizing circuit for the circuit breaker closing solenoid 8 which extends from positive power through the winding of the closing solenoid 8, a conductor 82 and a contact element 84 of the closing relay 20 to negative power, and the closing solenoid 8 will actuate the circuit breaker 12 to closed circuit position.

The actuation of the closing relay 20 will cause it to close its own holding circuit which extends from positive power through the contact element 62, the conductor 64, the resistor 68, the conductor 70, the winding of the closing relay 20, the conductor 72, and a contact element 81 of the closing relay 20 to negative power.

When the closing solenoid 8 is actuated, its contact element 102 will be moved to closed circuit position to close an energizing circuit for the auxiliary relay 16 which extends from positive power through the contact element 62, the conductor 64, a conductor 96, the winding of the auxiliary relay 16, conductors 98 and 100, and the contact element 102 to negative power.

When the relay 16 is thus energized and actuated, it will close its own holding circuit which extends from positive power through the contact element 62, the conductors 64, and 96, the winding of the relay 16, the conductors 98 and 100 and a contact element 104 of the relay 16 to negative power. The actuation of the auxiliary relay 16 will also close a shunting circuit for the winding of the closing relay 20 which extends from one terminal of the winding of the relay 20, through the conductors 70 and 106, the contact element 76 in its upper position, and conductors 108, 74 and 72 to the other terminal of the winding of the closing relay 20. The resistor 68 will limit the current in the shunting circuit which is completed by the contact element 76 in its upper position. The completion of the shunting circuit for the winding of the closing relay 20 will cause the closing relay 20 to drop thus breaking its holding circuit by the movement of the contact element 81 to open circuit position and opening the energizing circuit for the closing solenoid 8 by the movement of the contact element 84 to open circuit position.

When the control device 4 is released the holding circuit for the winding of the relay 14 will be opened by the movement of the contact element 60 to open circuit position except for the indicating lamp G in series circuit with the winding of the relay 14 which, as has been explained hereinbefore, will not permit sufficient current to flow in the winding of the relay 14 to hold it in its closed position. When the relay 14 opens its contact element 62 will move to open circuit position to open the holding circuit of the auxiliary relay 16.

With the relays 14, 16 and 20 deenergized and the circuit breaker held in closed circuit position by the engagement of the detents 38 and 40, an energizing circuit for the indicating lamp R will be completed by the contact elements 56 and 80 in their upper positions and the contact element 94 in its lower position. This energizing circuit extends from positive potential through the contact element 56 in its upper position, a conductor 110, the contact element 94 in its lower position, conductors 90, 24 and 112, a rectifier or other suitable unidirectional current conducting device 114, conductors 116 and 118, the indicating lamp R, conductors 22 and 46, the contact element 80 in its upper position, a conductor 120, the contact element 88, conductors 122 and 124, the winding of the trip relay 18, and conductor 126 to negative power. The characteristics of the winding of the trip relay 18 and the impedance of the indicating lamp R are such that the current flowing in the series circuit including these two elements is not sufficient to actuate the trip relay 18. The circuit breaker 12 will thus be held in closed circuit position and the indicating lamp R will be energized to indicate the position of the circuit breaker.

It will be noted that the indicating lamps G and R are each connected in a series circuit between the line conductors 22 and 24 with their associated rectifiers 54 and 114, and that the rectifiers 54 and 114 are disposed to conduct current in opposite directions between the conductors 22 and 24. Thus, when the circuit breaker 12 is in open circuit position, the potential applied to the conductors 22 and 24 is such as to cause current to flow through the indicating lamp G only and when the circuit breaker 12 is in closed circuit position, the potential applied to the conductors 22 and 24 is of such polarity as to cause current to flow in the circuit of the indicating lamp R only.

When it is desired to open the circuit breaker 12, the control device 6 at the control station may be manually actuated to complete a shunting circuit for the indicating lamp R and to thus so lower the impedance of the circuit through the winding of the trip relay 18 as to actuate the relay 18. This energizing circuit for the winding of the relay 18 extends from positive potential through the contact element 56 in its upper position, the conductor 110, the contact element 94, the conductors 90, 24 and 112, the rectifier 114, the conductor 116, a contact element 128 of the circuit control device 6, a conductor 130, conductors 22 and 46, the contact element 80, the conductor 120, the contact element 88, the conductors 122 and 124, the winding of the relay 18 and the conductor 126 to negative power.

The actuation of the trip relay 18 will cause it to close an energizing circuit for the trip solenoid 10 which extends from positive power through the winding of the trip solenoid 10, a conductor 132, the contact element 44 in its upper position, a conductor 134 and a contact element 136 of the relay 18 to negative power. This energization of the trip solenoid 10 will cause it to move the detent 38 from engagement with the detent 40 and permit the circuit breaker 12 to move to open circuit position. When the circuit control device 6 is released, its contact element 128 will move to open circuit position, thus again introducing the indicating lamp R in the circuit of the winding of the trip relay 18 and causing the trip relay 18 to drop. The apparatus at the control and remote stations will then be in the position shown in Fig. 1.

The circuit breaker 12 may be disposed to complete a circuit between a power bus represented by the conductors A, B and C and a feeder bus represented by the conductors X, Y and Z, and an automatic trip means may be provided at the remote station for energizing the trip relay 18 when an overload occurs or when any other desired condition exists at the remote station. This automatic trip system may comprise an overload relay 138 connected as indicated to be responsive to current in the conductor X and having a contact element 140 which, when the relay 138 is energized by predetermined current flow, will close an energizing circuit for the winding of the trip relay 18, which extends from positive power through the contact element 140, the conductor 124, the winding of the trip relay 18 and the conductor 126 to negative power. The trip relay 18 will then function to trip the circuit breaker as hereinbefore described.

The alternative form of control at the control station, as shown in Figure 2, comprises a selective circuit control device 26 having a manually actuated cam element 141 which, when it is in the horizontal position as shown in the drawing, will permit engagement of the contact elements 142 and 144. With the selector circuit control device 26 in this position, the operating circuit control device 28 may be actuated to complete a shunting circuit for the indicating lamp G which extends from one terminal of the indicating lamp G through the conductors 48 and 22, the contact elements 142 and 144, a conductor 146, a contact element 148 of the circuit control device 28, and conductors 52 and 50 to the other terminal of the indicating lamp G. The completion of this shunting circuit for the indicating lamp G will cause the auxiliary relay 14 at the remote station to be actuated to close the circuit breaker 12 as hereinbefore described in connection with the operation of the embodiment of the invention of Fig. 1.

Likewise, when the manually actuated cam element 141 of the selector circuit control device 26 is in a vertical position, the contact element 142 will engage the contact element 150, and the shunting circuit for the indicating lamp R may then be completed by the actuation of the operating circuit control device 28. This shunting circuit extends from one terminal of the indicating lamp R through the conductors 118 and 116, a contact element 152 of the operating circuit control device 28, a conductor 154, the contact elements 150 and 142, and the conductors 22 and 23 to the other terminal of the indicating lamp R. The completion of this shunting circuit for the indicating lamp R will cause the trip relay 18 at the remote station to be actuated to thus trip the circuit breaker 12.

The embodiments of the invention shown in Figs. 3 and 4 include means for completely de-energizing the auxiliary relay 14 when the control devices 4 and 28, respectively, are released to permit the auxiliary relay 14 to drop in the event that the characteristic of the auxiliary relay 14 is such that it may be held in position if it were connected in series circuit with the indicating lamp G and in the event that it were energized in series circuit with the indicating lamp G when in its actuated position.

In the embodiment shown in Fig. 3, it will be seen that instead of providing a shunting circuit for the indicating lamp G, the contact element 60 of the circuit control device 4 opens the circuit of the indicating lamp G and closes the energizing circuit for the auxiliary relay 14 when it is manually actuated, and opens the energizing circuit for the relay 14 when it is released and then connects the indicating lamp G in series circuit with the relay 14. It will be seen that the indicating lamp G, instead of being connected across the conductors 22 and 24 in series circuit with its associated rectifier 54 will be connected across the conductors 22 and 24 in a circuit which extends from the conductor 22, through the conductor 48, the contact element 128 of the circuit control device 6 in its released position, a conductor 49, the indicating lamp G, a conductor 51, the contact element 60 of the circuit control device 4 in its released position, conductors 50 and 52 and the rectifier 54 to the conductor 24.

Thus, when the auxiliary relay 18 is being energized through the contact element 60 and it is desired to drop the relay 14, its circuit will be broken when the contact element 60 of the circuit control device 4 is released to thus provide positive deenergization of the winding of the relay 14, thus insuring that relay 14 will drop, and then the contact element 60 of the circuit control device 4 will close the circuit of the indicating lamp G in series circuit relation with the winding of the auxiliary relay 14.

The embodiment of the invention shown in Fig. 4 is similar to that shown in Fig. 2, but provides a means for positively deenergizing the winding of the relay 14 at the remote station when the operating circuit control device 28 at the control station is released and before the indicating lamp G is connected in series circuit with the winding of the relay 14. Instead of being connected directly between the conductors 22 and 24, the circuit through the indicating lamp G between the conductors 22 and 24 extends through the contact element 148 of the operating circuit control device 28 in its released position, and includes the conductor 48, the indicating lamp G, the conductor 50, the contact element 148 in its released or upper position, conductors 51 and 52, and the rectifier 54 to the conductor 24. Similar reference numerals have been applied to the conductors in the circuits at the control station in Figs. 1 and 3 and in Figs. 2 and 4 to more clearly illustrate the similarities and differences in structure and functioning of these similar embodiments of the invention.

Thus it will be seen that I have provided a control system which shall function to control and supervise from a control station apparatus at a remote station over a single conducting channel and utilizing a source of power at a remote station only, which shall require a minimum of apparatus and which shall be simple and inexpensive to manufacture, install, operate and maintain.

In compliance with the requirements of the patent statutes I have shown and described herein the preferred embodiments of my invention. It is to be understood, however, that the invention is not limited to the precise constructions shown and described but is capable of modification by one skilled in the art, the embodiments herein shown being merely illustrative of the principles of my invention.

I claim as my invention:

In a system for controlling from one station the operation of two electrically operable means at another station, a single conducting channel extending between the stations, a single source of direct current power at the said other station, means controlled by the operation of one of said electrically operable means for connecting the other of the said electrically operable means and the conducting channel to be energized with one polarity from two terminals only of the source of power, means controlled by the operation of the said other electrically operable means for connecting the said one electrically operable means and the conducting channel to be energized with the opposite polarity from the said two terminals only of the source of power, polarity responsive indicating means connected to the conducting channel at the said one station for indicating the operations of the two electrically operable means at the other station, said indicating means being connected across the conducting channel and having such impedance as to prevent the amount of current necessary to operate said electrically operable means from flowing in the circuit of the said electrically operable means, and circuit control means at the said one station for so reducing the impedance of the circuit of said electrically operable means as to permit sufficient current to flow to operate said electrically operable means, said indicating means comprising two indicating devices and two unidirectional current conducting devices and two series circuits each including one of said indicating devices and one of said unidirectional current conducting devices connected across said conducting channel, the unidirectional conducting devices being connected to conduct current in opposite directions, said circuit control means comprising two selectively operable circuit control devices having front and back contact elements, the circuit connecting one of said indicating devices across the conducting channel extending through the back contact elements of both of said circuit control devices and one of said unidirectional conducting devices, each of the front contact elements of said circuit control devices being connected in a separate circuit extending across said conducting channel in series circuit relation with a separate one of said unidirectional current conducting devices.

WILLARD A. DERR.